(12) United States Patent
Kawahara et al.

(10) Patent No.: US 12,663,035 B2
(45) Date of Patent: Jun. 23, 2026

(54) JOINT STRUCTURE, JOINT BODY, AND MEMBER SET

(71) Applicant: TORAY Industries, Inc., Tokyo (JP)

(72) Inventors: Kota Kawahara, Iyo-gun (JP); Hiroaki Matsutani, Iyo-gun (JP); Masato Honma, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 281 days.

(21) Appl. No.: 18/568,886

(22) PCT Filed: Jun. 16, 2022

(86) PCT No.: PCT/JP2022/024111
§ 371 (c)(1),
(2) Date: Dec. 11, 2023

(87) PCT Pub. No.: WO2022/265062
PCT Pub. Date: Dec. 22, 2022

(65) Prior Publication Data
US 2024/0288018 A1 Aug. 29, 2024

(30) Foreign Application Priority Data
Jun. 18, 2021 (JP) ................................ 2021-101379

(51) Int. Cl.
*F16B 12/04* (2006.01)
*B29C 65/00* (2006.01)
*F16B 4/00* (2006.01)

(52) U.S. Cl.
CPC ............ *F16B 12/04* (2013.01); *B29C 66/124* (2013.01); *B29C 66/12423* (2013.01);
(Continued)

(58) Field of Classification Search
CPC .... A47B 2200/0074; A47B 2200/0077; A47B 2200/0081; A47B 2200/0085;
(Continued)

(56) References Cited

U.S. PATENT DOCUMENTS 16,557 A * 2/1857 Stimpson ................ E06B 3/984
403/382
435,759 A * 9/1890 Marter ...................... E04B 2/02
217/65
(Continued)

FOREIGN PATENT DOCUMENTS

DE 3639143 A1 * 5/1988 ............ F16B 12/125
DE 9411775 U1 * 10/1994 ........ F16B 2012/466
(Continued)

OTHER PUBLICATIONS

International Search Report (PCT/ISA/210), issued in PCT/JP2022/024111, dated Jul. 19, 2022.
(Continued)

*Primary Examiner* — Josh Skroupa
(74) *Attorney, Agent, or Firm* — Birch, Stewart, Kolasch & Birch, LLP

(57) ABSTRACT

Provided is a joint structure, a joined assembly, and a set of members. It provides a joint structure including a first joint part formed in a first member and a second joint part formed in a second member that are fitted and fixed together wherein at least either of the first member and the second member is made of a fiber reinforced plastic material that contains reinforcing fibers with an average fiber length of 1 mm or more; the first joint part has a recessed shape in at least one cross-section of the joint structure while the second joint part has a shape that fits into the recessed shape of the first joint part in that cross-section; and there exists a pressing force between the first joint part and the second joint part so
(Continued)

that the first member and the second member are fitted and fixed together.

16 Claims, 5 Drawing Sheets

(52) U.S. Cl.
CPC ...... F16B 4/004 (2013.01); *A47B 2230/0074* (2013.01); *F16B 2012/046* (2013.01); *F16B 2200/30* (2018.08)

(58) Field of Classification Search
CPC .... A47B 2200/0088; A47B 2200/0092; A47C 4/021; B29C 66/124; B29C 66/1242; B29C 66/12423; B29C 66/565; F16B 4/004; F16B 12/04; F16B 12/125; F16B 2012/043; F16B 2012/046; F16B 2012/466; F16B 2200/30; Y10S 403/11; Y10S 403/13; Y10T 403/7039; Y10T 403/7094; Y10T 403/7096; Y10T 403/7098
USPC ................. 403/361, 381, 382, 383, DIG. 11, 403/DIG. 13
See application file for complete search history.

(56) References Cited

U.S. PATENT DOCUMENTS

| | | | | |
|---|---|---|---|---|
| 3,193,886 A | * | 7/1965 | Wenger | F16B 12/04 403/265 |
| 3,591,212 A | * | 7/1971 | Rhyne | F16B 12/46 403/381 |
| 4,025,215 A | * | 5/1977 | Murdock | F16B 12/04 403/381 |
| 4,540,308 A | * | 9/1985 | Colby | F16B 12/00 403/219 |
| 5,165,816 A | * | 11/1992 | Parasin | E04C 2/10 403/381 |
| 5,193,931 A | * | 3/1993 | Arato | F16B 12/04 403/402 |
| 6,041,847 A | * | 3/2000 | Lai | E06B 3/486 160/235 |
| 8,173,238 B2 | * | 5/2012 | Okano | B32B 27/286 428/58 |
| 9,993,993 B2 | * | 6/2018 | Simmons | B32B 15/00 |
| 10,112,363 B2 | * | 10/2018 | Coïc | B29C 65/565 |
| 11,346,382 B2 | * | 5/2022 | Davis | F16B 12/125 |
| 2006/0214493 A1 | * | 9/2006 | Yee | F16B 12/125 297/445.1 |
| 2011/0281061 A1 | | 11/2011 | Nakamura et al. | |

FOREIGN PATENT DOCUMENTS

| | | | | | |
|---|---|---|---|---|---|
| DE | 202014003304 U1 | * | 6/2014 | ........ | F16B 2012/466 |
| FR | 1204682 A | * | 1/1960 | ............. | F16B 12/04 |
| GB | 2147969 A | * | 5/1985 | ........... | F16B 12/125 |
| JP | 6-330953 A | | 11/1994 | | |
| JP | 2003-65316 A | | 3/2003 | | |
| JP | 2007-196684 A | | 8/2007 | | |
| WO | WO 2010/084809 A1 | | 7/2010 | | |

OTHER PUBLICATIONS

Written Opinion of the International Searching Authority (PCT/ISA/237), issued in PCT/JP2022/024111. dated Jul. 19, 2022.

* cited by examiner

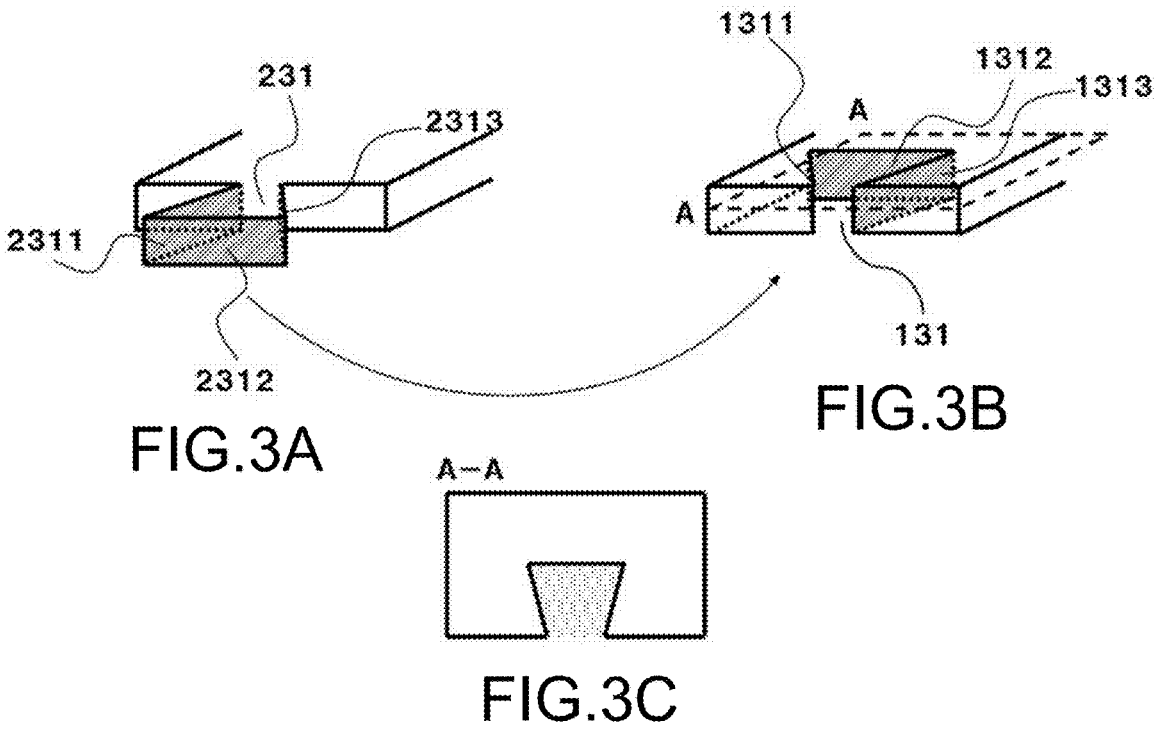
FIG.3A
FIG.3B
FIG.3C
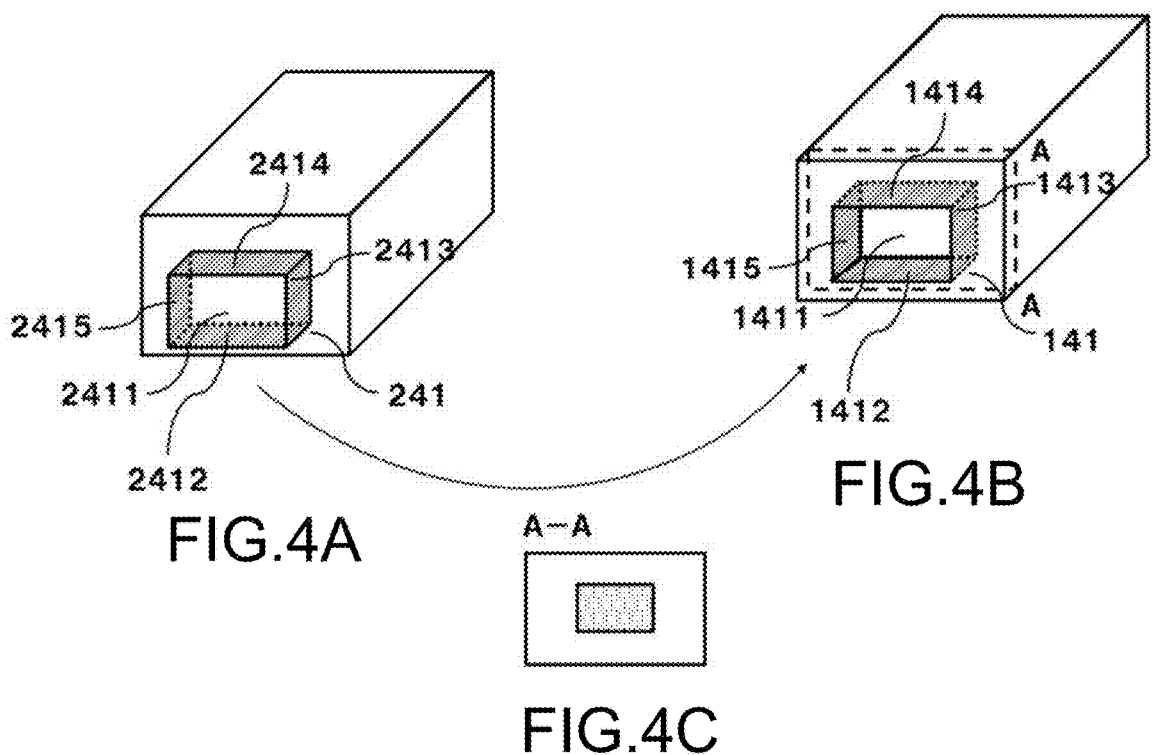
FIG.4A
FIG.4B
FIG.4C

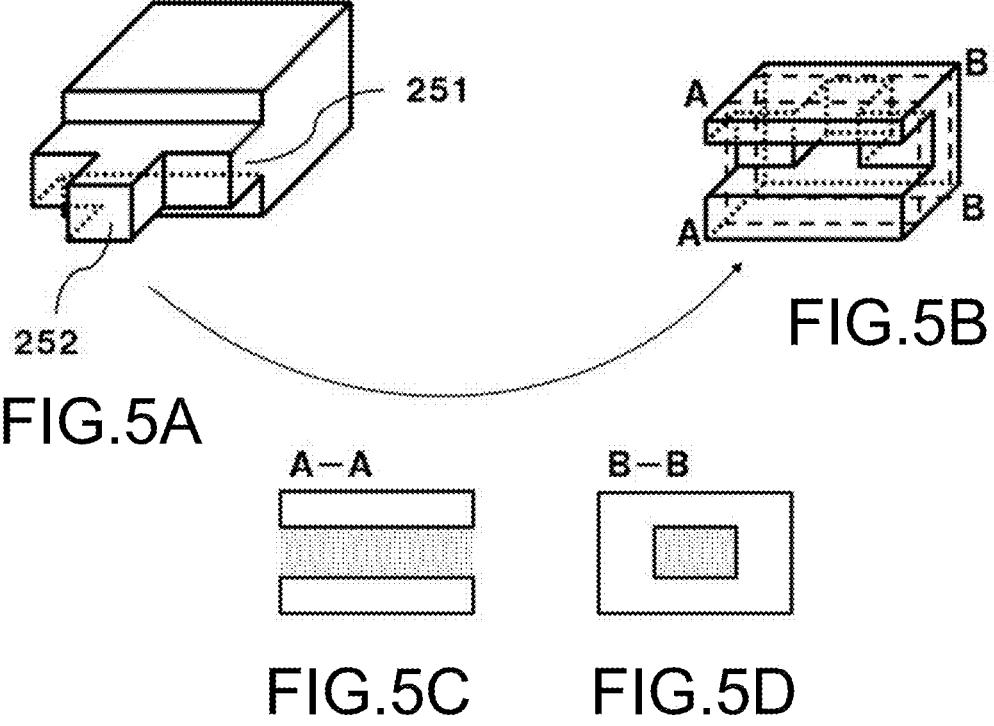
FIG.5A
FIG.5B
FIG.5C        FIG.5D
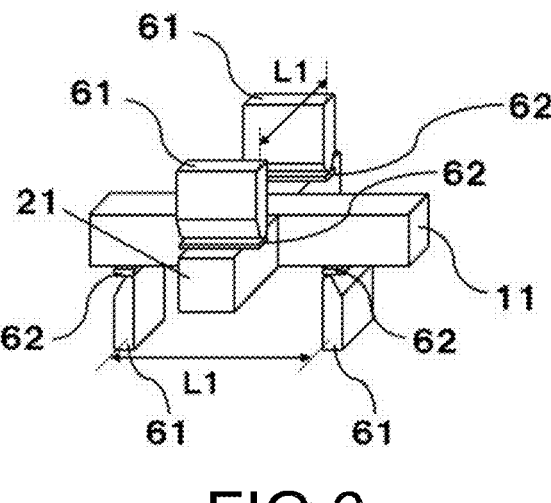
FIG.6

JOINT STRUCTURE, JOINT BODY, AND MEMBER SET

TECHNICAL FIELD

The present invention relates to a joint structure using a fiber reinforced plastic material and also relates to a joined assembly that includes a fiber reinforced plastic member joined to another by the joint structure.

BACKGROUND ART

In recent years, fiber reinforced plastic materials, which excel in terms of lightweight and high strength, have been utilized in various industrial applications. When joining fiber reinforced plastic materials to one another, or when joining a fiber reinforced plastic material to a member made of other material, such means as adhesives, bolts, rivets, etc., have been used traditionally in most cases. However, when adhesives or rivets are used, disassembly is not easy once such members are joined, making their relocation and reuse difficult. Additionally, when bolts or rivets are used, it leads to an increased weight, diminishing the weight reduction benefits offered by the fiber reinforced plastic material. Thus, as a joining method that can ensure ease of disassembly while avoiding an increase in weight as compared with the use of adhesives, bolts, rivets, or the like to join members, there exists a technique that utilizes an engaging structure attributed to the shapes of the members (for allowing the members to mesh correctly) to develop a joining strength in a direction different from the fitting direction (see Patent document 1).

PRIOR ART DOCUMENTS

Patent Documents

Patent document 1: Japanese Unexamined Patent Publication (Kokai) No. 2020-94659

SUMMARY OF INVENTION

Problems to be Solved by the Invention

When joining members by using only such an engaging structure as proposed in Patent document 1, the joint structure cannot be maintained if there occurs an external force in the fitting direction (the direction in which the members are relatively moved during fitting operations) or an influence of the members' own weight, and therefore, it can only be applied to joints that bear loads solely in the direction where the members are engaged. When applying to a joint where a load occurs in the fitting direction, additional members will be required to restrict movements in the load direction, leading to an increase in weight and making joining and disassembly more difficult. Under such circumstances, there are demands for a technique that can join fiber reinforced plastic materials only by fitting. However, fiber reinforced plastic materials are difficult to mold and process into fine shapes, resulting in low dimensional accuracy, and consequently, there has been the problem of low joining strength in the fitting direction of members.

The present invention was made in view of the above problems, and the main object thereof is to realize a joint structure that uses a fiber reinforced plastic material to realize a high joining strength in the fitting direction.

Means of Solving the Problems

The present invention adopts the following constitution to solve the problems described above.

The invention provides a joint structure including a first joint part formed in a first member and a second joint part formed in a second member that are fitted and fixed together wherein at least either of the first member and the second member is made of a fiber reinforced plastic material that contains reinforcing fibers with an average fiber length of 1 mm or more; the first joint part has a recessed shape in at least one cross-section of the joint structure while the second joint part has a shape that fits into the recessed shape of the first joint part in that cross-section; and there exists a pressing force between the first joint part and the second joint part so that the first member and the second member are fitted and fixed together.

Advantageous Effects of the Invention

According to the present invention, it is possible to obtain a joined assembly that uses a fiber reinforced plastic material and exhibits high joining strength in the fitting direction.

BRIEF DESCRIPTION OF THE DRAWINGS

FIGS. 3A-3C This is a schematic diagram showing an example of the joint structure according to the present invention that has a groove.

FIGS. 4A-4C This is a schematic diagram showing an example of the joint structure according to the present invention that has a hole.

FIGS. 5A-5D This is a schematic diagram showing an example of the joint structure according to the present invention in which a groove and a hole are combined.

FIG. 6 This is a schematic diagram showing a method for vertical pull-out test.

DESCRIPTION OF PREFERRED EMBODIMENTS

The present invention will be described below using drawings when required for easy understanding, though the present invention is not limited to these drawings.

The present invention relates to a joint structure designed to join members at least one of which is made of a fiber reinforced plastic (FRP) material. The joint structure includes a first joint part formed in a first member and a second joint part formed in a second member that are fitted and fixed together wherein at least either of the first member and the second member is made of a fiber reinforced plastic material that contains reinforcing fibers with an average fiber length of 1 mm or more and also wherein the first joint part has a recessed shape in at least one cross-section of the joint structure while the second joint part has a shape that fits into the recessed shape of the first joint part in that cross-section. Thus, in simple terms, the second member is fitted into the first member to form the joint structure. Here, in the present Description, a "member" refers to a structural unit in the form of one shaped body made of a single material. Furthermore, to calculate the average fiber length of the reinforcing fibers present in the fiber reinforced plastic material, resin portions of the fiber reinforced plastic material are removed by a technique such as combustion and leaching, and 400 fibers are selected randomly from the remaining reinforcing fibers, followed by measuring their lengths to the nearest 10 μm and calculating their average.

Figure 1:
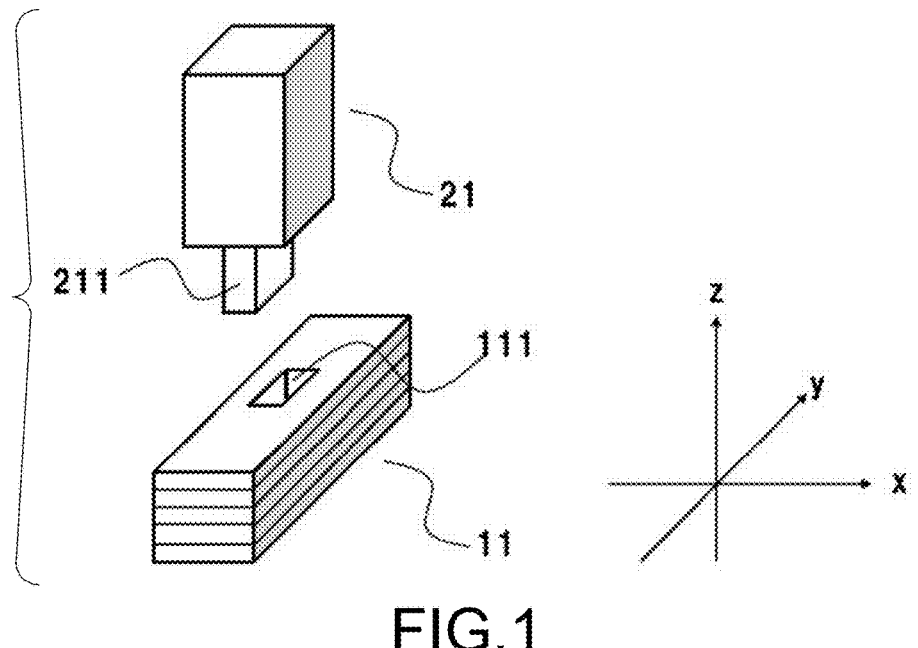
FIG. 1 This is a schematic diagram showing an example of the joint structure according to the present invention.

FIG. 1 is a schematic diagram showing an example of the simplest embodiment of the joint structure according to the present invention. In this embodiment, a first joint part 111, which is in the form of a rectangular hole, is present in a first member 11. More specifically, the first joint part 111 has a recessed shape in a cross section parallel to the xz-plane and in a cross section parallel to the yz-plane (hereinafter, a part having a recessed shape will be occasionally referred to as recessed part). Compared with this, a second joint part 211, which is a rectangular protrusion that corresponds to the rectangular hole of the first joint part 111, is present in a second member 21. More specifically, the second joint part 211 has a protruded shape in the cross section parallel to the xz-plane and in the cross section parallel to the yz-plane that fits into the recessed shape of the first joint part 111 (hereinafter, a part having a protruded shape will be occasionally referred to as protruded part). Then, the second joint part 211, which is in the form of a protrusion, fits into the first joint part 111, which is in the form of a hole, to form a doweling-like joint structure.

Here, in the example given in FIG. 1, the joint structure has a cross-section in which the first joint part has a recessed shape and the second joint part has a protruded shape in that cross section to fit into the aforementioned recessed shape. However, it may be a half-lap joint structure that does not have a protruded shape in the aforementioned cross section as described later with reference to FIG. 9.

For the present invention, furthermore, there is a pressing force between the first joint part and the second joint part, and this pressing force allows the first joint part and the second joint part to be fitted and fixed together. The pressing force refers to the pressure that is attributed to the elasticity of the first member and/or the second member and works between the first joint part and the second joint part. It is preferable for the pressing force to arise from a restoring force that occurs against a deformation resulting from a difference in size between the first joint part and the second joint part. In the embodiment shown in FIG. 1, the dimensions of the second joint part 211, which is a protrusion, measured in the x and/or y directions are larger than the corresponding dimensions of the first joint part 111, which is a hole. More specifically, the dimensions in the x and/or y directions of the second joint part 211, which is a protrusion, and the corresponding dimensions of the first joint part 111, which is a hole, are designed to have such differences that allow the former to be strained and deformed (shrunk) to the same size as the latter when a pressing force is applied to push the second member into the first member. If they are designed in this manner, the second joint part can be pushed into the first joint part when fitting the two members together, and the two members are fitted and fixed together by the pressing force that occurs between the two joint parts. These dimensional differences can be designed appropriately by a skilled person in consideration of the materials of the first member and the second member and the required fixing strength, but it is generally more than 0 mm and not more than 3 mm. Here, it is noted that it is only necessary that the dimension in either the x direction or the y direction of the second joint part 211 be larger than the corresponding dimension of the first joint part as long as the fitting and fixation are achieved in a required manner. In other cases, they may be designed to have such dimensional differences that allow the dimensions in the x and/or y directions of the first joint part 111, which is a hole, to be strained and deformed (enlarged) by the force applied to press the first member into the second member to the same dimensions in the corresponding directions of the second joint part 211, which is a protrusion, or both the first joint part and the second joint part may be designed to deform to the same dimensions.

For the present invention, the first joint part and the second joint part before fitting have a dimensional difference at least in either of the x direction and the y direction that prevents them from being fitted together if they maintain their original dimensions. To allow them to be fitted together in such cases, a method that can be proposed as a good example is to eliminate the dimensional difference partially or temporarily. To give an example, a good method to partially eliminate such a dimensional difference is to chamfer at least either of the first joint part and the second joint part to eliminate the dimensional difference in the end portion, followed by gradually generating a pressing force during the course of applying stress for fitting. Another good method to temporarily eliminate a dimensional difference is to apply stress to at least either of the members during the course of fitting in order to expand the recessed part or shrink the protruded part, thereby eliminating the dimensional difference.

Figure 2:
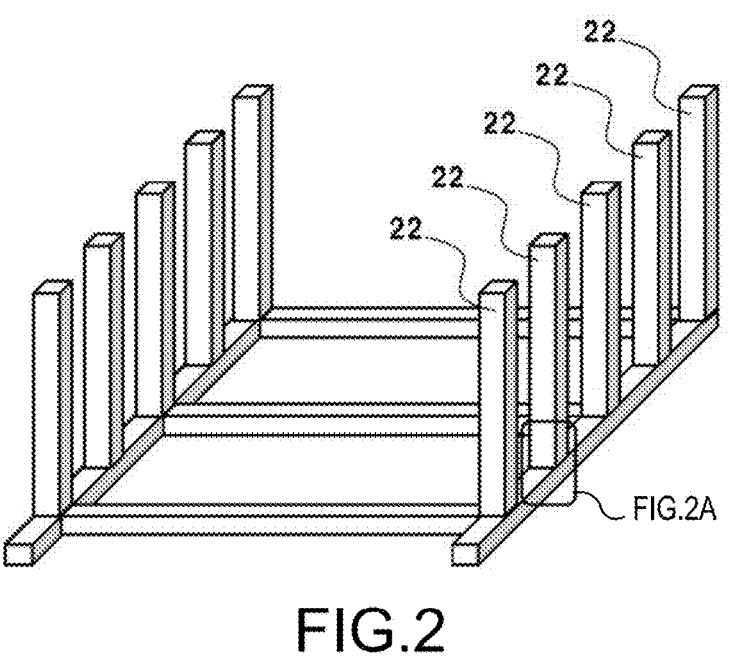
FIGS. 2 and 2A This is a schematic diagram showing a foundation of a wooden building and its surroundings as an example of the application of the joint structure according to the present invention.
Figure 2A:
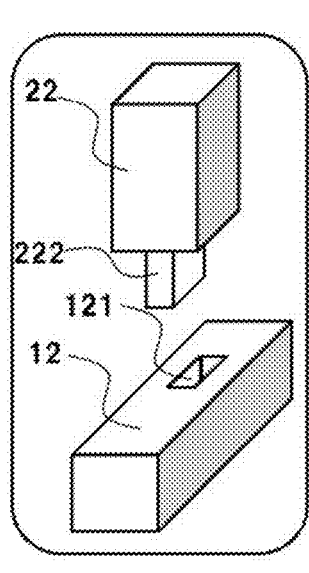

FIGS. 2 and 2A are schematic diagrams in which the joint structure of the embodiment shown in FIG. 1 is applied to the base and its surroundings of a wooden building. In this embodiment, each first member 12 and each second member 22 are shaped like long square pieces of timber. The first member 12 has a hole 121 as its first joint part while the second member 22 has a protrusion 222 as its second joint part, where the first joint part 121 and the second joint part 222 have the same the forms as those of the embodiment shown in FIG. 1. The present embodiment differs from the one shown in FIG. 1 in that two or more second members 22 are joined to a single first member 12 to form a joined assembly. Thus, the first member and the second member may have two or more first joint parts and second joint parts, respectively.

Figure 9:
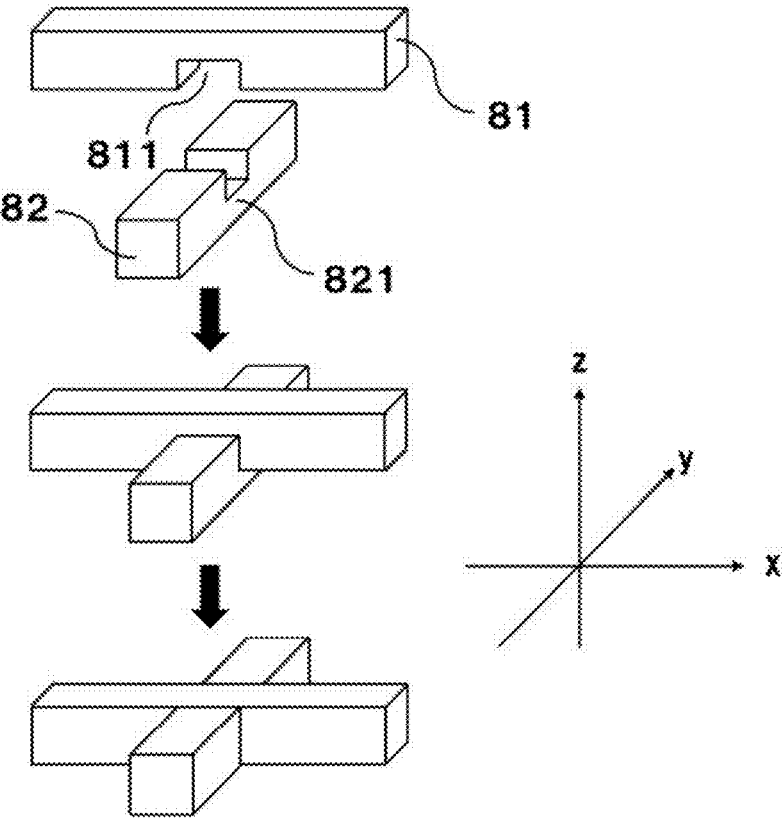
FIG. 9 This is a schematic diagram showing a test piece for vertical pull-out test.

More specifically, the joint structure according to the present invention can be formed using members each having both a first joint part and a second joint part, and in such cases, each of these members can be regarded as either a first member or a second member. As another method, a half-lap joint structure as illustrated in FIG. 9 may be adopted, and in this case, the two members have joint parts having the same shape, with each member having a joint structure having a recessed shape in at least one cross-section (the member 81 and the member 82 have a recessed shape in a cross-section parallel to the xz-plane and in a cross-section parallel to the yz-plane, respectively). This means that the "first member" and the "second member" are relative concepts designed to explain the present invention, and in certain embodiments, it may not be clear which of the members is the first member or the second member. If attention is directed to one joint structure here, in the case where each of the two members joined by the joint structure has a recessed shape in at least one cross-section of the joint structure, it can be considered to fall in the scope of the present invention if either of the members is regarded as the first and the other as the second.

In the joint structure according to the present invention, at least either of the first member and the second member is made of a fiber reinforced plastic material containing reinforcing fibers with an average length of 1 mm or more. The inclusion of such fibers with an average length of 1 mm or more allows the member itself to develop good mechanical characteristics, and when fitted to another, a pressing force arises due to the restoring force of the reinforcing fibers to realize a high joining strength. It is preferable for the average fiber length to be 3 mm or more.

As long as at least either of the first member and the second member is made of a fiber reinforced plastic material containing reinforcing fibers with an average length of 1 mm or more, the material of the other member will not be particularly limited and it may be of the same fiber reinforced plastic material or of other plastic material, wood, metal, concrete, etc. Hereinafter in the present Description, either of the first member and the second member that is made of a specific fiber reinforced plastic material containing reinforcing fibers with an average length of 1 mm or more will be referred to as elastic FRP member. Thus, for the present invention, it is sufficient if either the first member or the second member is an elastic FRP member, and it is more preferable for the present invention that both be elastic FRP members.

Good reinforcing fibers to incorporate in an elastic FRP member include carbon fibers, glass fibers, aramid fibers, alumina fibers, silicon carbide fibers, boron fibers, metal fibers, natural fibers, and mineral fibers, and a combination of two or more thereof may also be used. The resin to include in an elastic FRP member may be either thermosetting or thermoplastic one, or a resin mixture of both thermosetting and thermoplastic resins may also be adopted.

Figure 7:
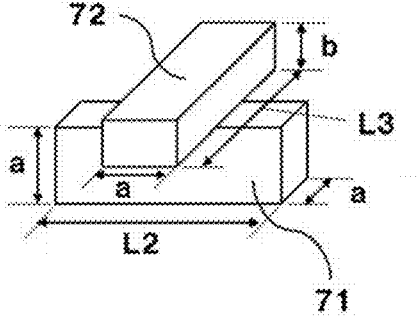
FIG. 7 This is a schematic diagram showing a method for partial compression test.

Of the first member and the second member used in the joint structure according to the present invention, the one that is an elastic FRP member preferably has a partial compression modulus of 1 MPa or more and 80 GPa or less in the direction where a pressing force occurs. The partial compression modulus refers to the modulus that occurs when a material is partially compressed, and in the field of wood industry, it is referred to also as indentation stiffness. Some materials show a partial compression modulus that is not equal to the full compression modulus that occurs when the entire plane is compressed. Since the first member and/or the second member are partially compressed when fitted and fixed, the partial compression modulus can serve as an important measure for fitting and fixation. If the partial compression modulus is in the above range, it ensures that, even when a member is combined with a stiff one, it can be fitted relatively easily while maintaining a sufficient pressing force for joining. If the partial compression modulus is less than 1 MPa, there might be instances where it is difficult to achieve a large pressing force required to ensure a high joining strength. On the other hand, if it is more than 80 GPa, each joint part may be difficult to deform, making fitting difficult when joint parts with a large dimensional difference is to be combined. For elastic FRP members, the partial compression modulus is more preferably 5 MPa or more and 50 GPa or less, and still more preferably 10 MPa or more and 40 GPa or less. Here, in the case where there are two or more directions in which a pressing force can occur, only the partial compression modulus in any one of those directions needs to be in the range specified above. For the present invention, the partial compression modulus is defined as one that is measured by the method described below. As shown in FIG. 7, a partial compression load is applied on a test piece 71 at a rate of 1 mm/min using a cushioning plate 72. To ensure that the cushioning plate will undergo only a minimum possible degree of deformation during compression test runs, the cushioning plate to use should have a compression modulus of more than 150 GPa. Each side of the test piece and the width a of the face of the cushioning plate that is in contact with the test piece are 20 mm, and the length L2 in the length direction of the test piece is 60 mm. The length L3 of the cushioning plate is 100 mm, and the thickness b of the cushioning plate is 13 mm. The quotient of the displacement of the test machine divided by the thickness a of the test piece is defined as the partial compression strain, and the quotient of the load divided by the contact area $a^2$ between the cushioning plate and the test piece is defined as the partial compression stress. The change in the partial compression stress that occurs as the rate of partial compression strain increases from 0.9% to 1.0% is divided by the change in the quantity of the partial compression strain. This measurement is performed three times (n=3) and the arithmetic average of the measurements is calculated and the value obtained is adopted as the partial compression modulus. To calculate the pressing force S (MPa), a method that can be proposed as a good example is to use the equation S=E (MPa)×d, where E is the partial compression modulus in the direction in which the pressing force occurs and d is the strain that is attributed to the difference in size between the first member and the second member. Here, to calculate the strain d, a method that can be proposed as a good example is to use the equation d=v/D, where D is the distance between the planes that pass the point of action of the pressing force and stand perpendicular to the line of action thereof and v is the magnitude of the deformation. It is noted that in this case, measurement of the partial compression modulus and the pressing force should be performed normally at a temperature of 23° C. and a humidity of 50%. However, it is desirable that the pressing force is measured under conditions that simulate an operating environment of the joint structure and that the difference in size is adjusted so that a sufficient pressing force is realized to fix the joint structure in the operating environment. Generally, it can be said that the first member and the second member can be regarded as being fixed firmly together by the pressing force if the pressing force calculated in this manner is 1 kPa or more, though the present invention is not limited to this.

Such an elastic FRP member preferably has a layered structure like the first member 11 shown in FIG. 1. An appropriate layered structure can be produced by stacking two or more sheets that are preliminarily impregnated with a fiber reinforced plastic material and then applying heat and pressure. Examples of such preliminarily impregnated sheets include unidirectional prepregs formed by aligning fibers in one direction and impregnating them with resin, notched prepregs produced by introducing cuts into unidirectional prepregs, woven prepregs formed by preparing a fiber material having a woven structure and impregnating it with resin, sheet molding compounds (SMC) formed by preparing fiber bundles composed of discontinuous fibers aligned in one direction, followed by randomly dispersing them and impregnating them with resin, and stampable sheets formed by impregnating web-like dispersed discontinuous fibers with resin. Thus, each layer in the elastic FRP member in this embodiment is produced from such a preliminarily impregnated sheet, and the elastic FRP member has a layered structure in which layers produced from preliminarily impregnated sheets are stacked. Here, all preliminarily impregnated sheets used in the layered structure may be of the same type or sheets of different types may be combined. In addition, from the viewpoint of efficiency of molding operations, it is also preferable to use a precursor sheet that is prepared by stacking two or more preliminarily impregnated sheets into a single integrated body.

It is preferable for the elastic FRP member to have a structure in which reinforcing fibers are dispersed in a web-like manner where reinforcing fibers are adhered together with resin at at least part of their intersections, and it is more preferable to have a layered structure that contains a stack of layers each having such a structure as described above. If such a structure is present, the network formed of reinforcing fibers works to allow the structure as a whole to develop elasticity, making a pressing force to be produced easily on joint parts. In such a structure, there are voids in which neither reinforcing fibers nor resin are present. The FRP material present in the elastic FRP member preferably contains such voids in an amount ranging from 20 vol % to 95 vol %. If these voids account for a proportion in this range, it allows the reinforcing fibers to have room for deformation, making the fitting operations easier and preventing the FRP material from being cracked or damaged by the pressing force. Moreover, this ensures that there will be a sufficient network of reinforcing fibers to make it possible to develop a pressing force on the joint parts due to the restoring force of the reinforcing fibers, thereby achieving a high joining strength.

To produce an elastic FRP member having such a structure as described above, it is preferable to use a sheet formed of discontinuous fibers, such as a stampable sheet, as precursor sheet. To measure the void fraction Vp (vol %) in an elastic FRP member, in the case where the elastic FRP member is one produced from a precursor sheet containing no voids, a method that can be proposed as a good example is to make calculations using the formula given below where $V_{NV}$ (cm$^3$) is the volume of the precursor sheet and $V_V$ (cm$^3$) is the volume of the elastic FRP member formed by expanding it.

$$V_p = 100 - (V_{NV}/V_V) \times 100$$

The above method is used for calculation in the case of using a void-free precursor sheet to produce the elastic FRP member. On the other hand, the above method cannot be applied in the case of not using a void-free precursor sheet to produce the elastic FRP member, and therefore, the void fraction is determined from observation of a cross-section of the elastic FRP member. In this case, a test piece with a length of 10 mm and a width of 10 mm is cut out from the elastic FRP member and the cross-section is observed by using a scanning electron microscope (SEM). Ten portions located at equal intervals from the surface of the elastic FRP member are photographed at a magnification of 1,000. Then, to determine the void fraction in the elastic FRP member, a method that can be proposed as a good example is to measure the area Aa of the voids present in each image and divide Aa by the total area of the image to calculate the void fraction in each cross-sectional image, followed by averaging measurements taken at ten positions.

There are two approaches for producing recessed and protruded shapes: in one, a base material prepared for use to form a fiber reinforced plastic material is deformed in accordance with a recessed or protruded shape, while in the other, a fiber reinforced plastic material is formed first, followed by processing it into a recessed or protruded shape by machining, drilling, or the like.

It is preferable for the reinforcing fibers present in a member formed from the fiber reinforced plastic material to have an average fiber length of 300 mm or less. In the case where a recessed or protruded shape is produced by deforming a base material in accordance with a recessed or protruded shape before molding it into a fiber reinforced plastic material, the use of reinforcing fibers with an average fiber length of 300 mm or less serves to deform the base material easily while preventing the fibers from becoming taut, making it easy to form a joint part having a recessed or protruded shape portion, while in the case where a recessed or protruded shape portion is produced by molding a fiber reinforced plastic material first and then processing it into a recessed or protruded shape by machining, drilling, or the like, it serves to suppress fluffing on the processed surface. The average fiber length of the elastic FRP member is more preferably 200 mm or less, and still more preferably 100 mm or less.

When an elastic FRP member having a layered structure is used as the first member, it is preferable to design it in such a manner that the direction in which the greatest pressing force occurs is substantially parallel to the in-plane direction of each layer in the layered structure. More specifically, in the case where a pressing force occurs both in the direction parallel to the layers (in-plane direction) and in the direction perpendicular to the in-plane direction (hereafter referred to as the out-of-plane direction), it is preferable that the in-plane dimension of the first joint part be designed to be slightly smaller than the corresponding dimension of the second joint part while its out-of-plane dimension is slightly larger than that of the second joint part, so that the pressing force in the in-plane direction will be larger than the pressing force in the out-of-plane direction. If it is designed as described above, it serves to hinder the inter-member pressing force from acting in the out-of-plane direction of the layered structure of the first member, thereby reducing the possibility of the separation of layers in the first member that may cause cracking. It is noted that in this case, it is preferable that the partial compression modulus in the in-plane direction of the first member be adjusted in the range specified above.

In particular, it is preferable to design it in such a manner that a pressing force occurs only in the in-plane direction while substantially no pressing force is generated in the out-of-plane direction. For instance, in the embodiment shown in FIG. 1, the dimension in the z-direction of the first joint part is preferably designed to be slightly larger than that of the second joint part, so that there will be some slack around the tip of the second joint part even when the first joint part has been fully inserted into the second joint part. If it is designed as described above, it serves to substantially completely prevent the inter-member pressing force from acting in the out-of-plane direction of the layered structure of the first member, thereby more largely reducing the possibility of the separation of layers in the first member that may cause cracking.

It is preferable for the layered structure to have an average thickness per layer of 200 μm or more. If it has a larger average thickness, it serves to facilitate the creation of a thick elastic FRP member. A thicker elastic FRP member can lead to a greater freedom in the shape of a joint part and assure a sufficient contact area on the joint part, ensuring a higher joining strength. It is more preferable for the average thickness to be 250 μm or more, and still more preferably 500 µm or more. To calculate the average thickness per layer, a method that can be proposed as a good example is to observe a cross-section of the elastic FRP member from the top to the bottom in the thickness direction and determine the distances between boundaries where, for example, the amount of resin changes significantly to determine the layer thicknesses, followed by averaging them over all layers. Alternatively, if the number of stacked pre-impregnated sheets present in the layered structure is known in advance, a method that can be proposed as a good example is to divide the thickness of the layered structure by the number of layers. Here, a layered structure to construct an elastic FRP member can be produced by stacking pre-impregnated sheets prepared in advance and molding them.

For the joint structure according to the present invention, it is preferable that the area of the portion where contact is maintained by a pressing force account for 30% or more of the area where the first joint part and the second joint part face each other. Here, the portion where the first joint part and the second joint part face each other refers to that portion of the contact surface occurring between them when they are joined together where, based on their shapes and dimensions, there is an expected possibility of the generation of a pressing force. In FIGS. 3A and 3B and 4A and 4B, the portion where the first joint part 131 or 141 and the second joint part 231 or 241 will face each other is indicated by hatching. In FIGS. 3A and 3B, the groove that acts as the first joint part 131 is a recessed part surrounded by the surfaces 1311 to 1313, while the second joint part 231 is a protruded part having the surfaces 2311 to 2313. In FIGS. 4A and 4B, the hole that acts as the first joint part 141 is a recessed part surrounded by the surfaces 1411 to 1415, while the second joint part 241 is a protruded part having the surfaces 2411 to 2415. Although the surface 1411 geometrically faces the surface 2411, no pressing force can occur on the surfaces 1411 and 2411 and therefore, they are not said herein to face each other. Accordingly, the total area of the surfaces where the they face each other refers to the total area of the surfaces 1311 to 1313 or the surfaces 2311 to 2313 in FIGS. 3A and 3B and the total area of the surfaces 1412 to 1415 or the surfaces 2412 to 2415 in FIGS. 4A and 4B. In general, of the portions that face others, that is, of the portions where pressing forces can occur, those that are in contact with others with pressing forces actually occurring in between should account for at least 30% or more of the total area of the portions because it serves to make full use of the pressing forces and achieve sufficient joining strength. It is more preferable for such an area proportion to be 40% or more, and still more preferably 50% or more.

There are no specific limitations on the method to use for measuring the area proportion of the portions that are in contact with others with pressing forces occurring in between, but a method that can be proposed as a good example is to determine the area proportion from the cross-section that includes the portions where the first joint part and the second joint part face each other. In this case, an appropriate cross-section that contains a portion that faces another is cut out, and the length of the portion in contact with another and the length of the portion facing another are measured. The area proportion of the portion in contact with another can be calculated by dividing the length of the portion in contact with another by the length of the portion facing another. To determine whether there is a portion that is in contact with another, a method that can be proposed as a good example is to thinly apply powder or paint or stick a pressure measurement film to either the first joint part or the second joint part, and then fit them together, followed by checking whether the other has a portion stained with the powder or paint or whether there is a portion where a pressure is sensed by the pressure measurement film. Such a portion is deemed to have been in contact with another and received a pressing force.

For the joint structure according to the present invention, it is preferable that the joint structure have a vertical pull-out strength of 0.05 MPa or more. For the present invention, a joint structure is formed by fitting the first joint part and the second joint part together and then they are separated by pulling either of them in the fitting direction. The vertical pull-out strength is calculated by dividing the maximum load occurring during the pulling step by the area of the portion where the first joint part and the second joint part face each other. If the vertical pull-out strength is in the aforementioned range, the structure can be maintained only by fitting them together without the need for adhesives, rivets, bolts, or other joining methods. It can be used for joint parts that receive a load in the direction opposite to the fitting direction. In addition, for the portion where they face each other, the minimum area that is required to achieve an adequate joining force can be reduced, and this enables the joining of small members and the creation of small joint structures. Furthermore, it realizes a reduction in the size of the recessed part and serves to prevent a decrease in the strength of the first member. It is noted that measurement of the vertical pull-out strength is performed basically at a temperature of 23° C. and a humidity of 50%, but it is preferable to take measurements under conditions that simulate an expected usage environment of the joint structure.

In the cross-section of a joint structure, the recessed portion of the first member that forms the recessed shape of the first joint part is preferably in the form of a groove or a hole created from the surface of the first member. For the present invention, as shown by the shaded region in the A-A cross-section in FIGS. 3A-3C, a groove is defined as a recess that partly connects with the outer periphery of the first member in a perpendicular plane (in-plane direction in the paper plane that shows a cross-section in FIGS. 3A-3C, the same applying also in FIGS. 4A-4C and 5A-5D) to the fitting direction (perpendicular to the paper plane that shows a cross-section in FIGS. 3A-3C, the same applying also in FIGS. 4A-4C and 5A-5D), that is, a recess that has an opening in the cross-section perpendicular to the fitting direction. On the other hand, as shown by the shaded region in the cross-section in FIGS. 4A-4C, a hole is defined as a recess that does not connect at all with the outer periphery of the first member in the perpendicular plane to the fitting direction, that is, a recess that does not have an opening in the cross-section perpendicular to the fitting direction. The groove and hole either may or may not penetrate through the first member in the fitting direction. If the recess in the first member is a groove or a hole, it serves to realize a sufficiently large mutually facing surface area to ensure the development of a sufficient pressing force for joining to achieve a high joining strength.

Furthermore, it is more preferable for the recess in the first member to have a shape formed by overlapping a groove and a hole. FIGS. 5A-5D show an example of a recess having a shape formed by overlapping a groove and a hole, along with an A-A cross-section of the groove and a B-B cross-section of the hole. In such a shape formed by overlapping a groove and a hole, as shown in FIGS. 5A-5D, there is a groove in a plane perpendicular to the fitting direction and there is a hole that connects to it and exists in another plane perpendicular to the fitting direction. The base portion 251 and the tip portion 252 of the second joint part correspond to the groove and the hole, respectively. The use of a shape formed by overlapping a groove and a hole helps to ensure a larger mutually facing surface area and form a joint part having a more complex shape, serving to make full use of the pressing force and realize a higher joining strength and joint accuracy.

In the case of the joint structure according to the present invention, if the joint structure is once constructed to meet the above conditions and then remodel to make dismantling unnecessary for a long term, such means as adhesives, thermal bonding, nails, and bolt/nuts may be used in combination to maintain the joint structure. The use of an adhesive is preferable because it serves not only to enhance the joining strength but also to act as a lubricant during fitting. Furthermore, in the case where the elastic FRP member or the mating member contains a thermoplastic material resin, this is preferable if the resin is one designed for thermal bonding, that is, it can be melted by heating and work as an adhesive on the joint part during cooling, because it ensures an enhanced joining strength without adding weight. The use of nails and bolt/nuts is preferable because they can be easily removed, allowing the joint structure to be dismantled again.

Another aspect of the present invention relates to a joined assembly that at least partly contains the joint structure according to the present invention. Still another aspect of the present invention is a set of members that includes a first member 11 and a second member 21 for forming the joint structure according to the present invention.

EXAMPLES

The present invention will now be illustrated in more detail with reference to examples, but it should be understood that the scope of the invention is not limited to these examples.

(1) Vertical Pull-Out Test of Joined Assembly

As shown in FIG. 6, a member 11 of a test piece, which was fixed by fitting, is supported with a support point distance L1 of 60 mm, and a load was applied to the other member 21 at a test speed of 5 mm/min until the fitted members were detached. A cushioning plate 62 with a width of 10 mm was inserted between the test piece and each jig 61. Measurement was performed three times (n=3), and the arithmetic average of the values obtained by dividing the maximum value of the load by the area of the portions where the first joint part 12 and the second joint part 22 faced each other was adopted as the vertical pull-out strength.

(2) Partial Compression Test of Fiber Reinforced Plastic Material

As shown in FIG. 7, a partial compression load was applied on a partial compression test piece 71 at a rate of 1 mm/min with a cushioning plate 72 placed thereon. A steel plate with a compression modulus of 200 GPa or more was used as the cushioning plate. Here, each side of the test piece and the width a of the face of the cushioning plate that was in contact with the test piece were 20 mm, and the length L2 in the length direction of the test piece was 60 mm. The length L3 of the cushioning plate was 100 mm, and the thickness b of the cushioning plate was 13 mm. The quotient of the displacement of the test machine divided by the thickness a of the test piece was defined as the partial compression strain, and the quotient of the load divided by the contact area $a^2$ between the cushioning plate and the test piece was defined as the partial compression stress. The change in the partial compression stress that occurred as the partial compression strain increased from 0.9% to 1.0% was divided by the change in the quantity of the partial compression strain. This measurement was performed three times (n=3) and the arithmetic average of the measurements was calculated and adopted as the partial compression modulus.

(3) Volume Fraction of Voids in Fiber Reinforced Plastic Material

The thickness $T_{NV}$ (mm) of the precursor sheet for elastic FRP member production (which, for the present invention, did not contain voids) was measured first, and then the thickness Tv (mm) of the elastic FRP member formed by expanding the precursor sheet was measured, followed by calculating the void fraction Vp (%) in the elastic FRP member by the formula given below.

$$V_p = 100 - \left( T_{NV}/T_V \right) \times 100$$

(4) Materials for Test Pieces

[Carbon Fiber]

A copolymer containing polyacrylonitrile as primary component was spun, calcined, and subjected to surface oxidation treatment to produce a continuous carbon fiber material containing a total of 12,000 single filaments. This continuous carbon fiber material had characteristics as given below.

Single filament diameter: 7 μm
Density: 1.8 g/cm³
Tensile strength: 4,600 MPa
Tensile elastic modulus: 220 GPa

[PP Resin]

A resin sheet with an areal weight of 100 g/m² containing 80% by mass of an unmodified polypropylene resin (Prime Polypro (registered trademark) J105G, manufactured by Prime Polymer Co., Ltd.) and 20% by mass of an acid-modified polypropylene resin (Admer QB510, manufactured by Mitsui Chemicals Inc.) was prepared. The resulting PP resin sheet had a density of 0.92 g/cm³.

[Reinforcing Fiber Mat]

Carbon fibers were cut to a length of 6 mm to prepare chopped carbon fibers. The chopped carbon fibers were introduced into a cotton opener to produce a cotton-like aggregate of reinforcing fibers that were almost free of bundles of reinforcing fibers having the original thickness. This reinforcing fiber aggregate was fed into a carding device equipped with a cylinder roll having a diameter of 600 mm to form sheet-like webs made of reinforcing fibers. In this step, the cylinder roll had a rotation speed of 320 rpm, and the doffer had a speed of 13 m/min. Such web sheets were stacked to form a reinforcing fiber mat. In the resulting reinforcing fiber mat, reinforcing fibers were found to be distributed almost in the form of single filaments. In addition, the reinforcing fiber mat had an average fiber length Lf of 6 mm and an areal weight of 50 g/m².

Example 1

Reinforcing fiber mats and PP resin sheets were laid in the pattern of [resin sheet/reinforcing fiber mat]$_{2S}$, and eight pre-impregnated sheets were prepared by impregnating the reinforcing fiber mats with the PP resin and laid to produce a layer stack. It is noted that the layer stack obtained above was a simple stack of eight pre-impregnated sheets that had not been integrated (the same applying in Examples given below). Then, the layer stack was integrated by carrying out the following steps (I) to (III) to provide a void-free precursor sheet.

(I) The layer stack is put in the cavity of a mold for press molding preheated at 200° C. and then the mold is closed.

(II) After applying a pressure of 2 MPa for 5 minutes, the cavity temperature is decreased to 50° C. while maintaining the pressure.

(III) The mold cavity is opened and the precursor sheet is taken out.

The resulting precursor sheet had a thickness of 4.4 mm. Subsequently, the following steps (IV) to (VI) were carried out to produce a fiber reinforced plastic material (FRP1).

(IV) The precursor sheet is put in the cavity of a mold for press molding preheated at 200° C., which is the same mold as used in (I), and the mold cavity is closed and maintained for 5 minutes. Then, the mold is opened, and a metal spacer is inserted in the end part thereof to adjust the thickness so that the resulting structure will have a thickness of 21.8 mm.

(V) The mold cavity is closed again, and the cavity temperature is decreased to 50° C. while maintaining the pressure.

(VI) The mold is opened and the fiber reinforced plastic material is taken out.

Figure 8:
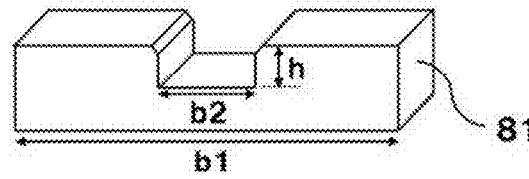
FIG. 8 This is a schematic diagram showing a member processed for half-lap joint.

Using an NC machine tool, the fiber reinforced plastic material prepared according to the above procedure was machined to a cross section of 20 mm×20 mm and a length b1 of 150 mm to provide members 81 and 82 (81 and 82 having the same shape) that were shaped for half-lap joint as shown in FIG. 8. The groove designed for half-lap joint had a depth h of 10 mm and a width b2 of 19.85 mm, and the upper edge of the groove was chamfered 2 mm as shown in the figure. The thickness of the fiber reinforced plastic material was divided by the number of pre-impregnated sheets to calculate the average thickness per layer. Two bodies of the resulting fiber reinforced plastic material were fitted and fixed together to form a joint structure as shown in FIG. 9, which was then used as a test piece for vertical pull-out test. A vertical pull-out test was conducted using the test piece for vertical pull-out test obtained above. In addition, a test piece for partial compression test as described in (2) was prepared by cutting the fiber reinforced plastic material produced through the steps (I) to (VI) using an NC machine tool. A partial compression test was conducted using the test piece for partial compression test obtained above. Test results are given in Table 1.

Example 2

Reinforcing fiber mats and PP resin sheets were laid in the pattern of [resin sheet/reinforcing fiber mat]$_{2S}$, and 14 pre-impregnated sheets were prepared by impregnating the reinforcing fiber mats with the PP resin and laid to produce a layer stack.

Except for extending the pressure application time in the step (II) to 8 minutes, the same procedure as in Example 1 was carried out to provide a fiber reinforced plastic material (FRP2). Here, the precursor sheet obtained had a thickness of 7.7 mm.

Then, except that the groove width b2 was adjusted to 19.80 mm, the same procedure as in Example 1 was carried out to provide a test piece for vertical pull-out test and a test piece for partial compression test. Test results are given in Table 1.

Example 3

Reinforcing fiber mats and PP resin sheets were laid in the pattern of [resin sheet/reinforcing fiber mat]$_{2S}$, and 40 pre-impregnated sheets were prepared by impregnating the reinforcing fiber mats with the PP resin and laid to produce a layer stack. Then the layer stack was integrated by carrying out the following steps (I) to (III) to provide a fiber reinforced plastic material (FRP3).

(I) The layer stack is put in the cavity of a mold for press molding preheated at 200° C. and then the mold is closed.

(II) After applying a pressure of 3 MPa for 20 minutes, the cavity temperature is decreased to 50° C. while maintaining the pressure.

(III) The mold cavity is opened and the fiber reinforced plastic material is taken out.

Here, the resulting fiber reinforced plastic material (FRP3) had a thickness of 21.8 mm. Due to the omission of the expansion steps (IV) to (VI), the void fraction of FRP3 was 0%.

Except that the groove width b2 was adjusted to 19.90 mm, the same procedure as in Example 1 was carried out to provide a test piece for vertical pull-out test and a test piece for partial compression test. Test results are given in Table 1.

Example 4

Using an NC machine tool, FRP1 and a cedar material were machined to a cross section of 20 mm×20 mm and a length b1 of 150 mm to provide members 81 and 82 that were shaped for half-lap joint as shown in FIG. 8. The groove designed for half-lap joint had a depth h of 10 mm and a width b2 of 19.85 mm, and the groove was chamfered 2 mm. An FRP1 member and a cedar member obtained above were fitted together as shown in FIG. 9 to provide a test piece for vertical pull-out test. A vertical pull-out test was conducted using the test piece for vertical pull-out test obtained above. Test results are given in Table 1.

Comparative Example 1

Two members shaped for half-lap joint were prepared by cutting the same cedar material as used in Example 4 and fitted together as shown in FIG. 9 to provide a test piece for vertical pull-out test. A vertical pull-out test was conducted using the test piece for vertical pull-out test obtained above. Test results are given in Table 1.

TABLE 1

|  | Example 1 | Example 2 | Example 3 | Example 4 | Comparative example 1 |
|---|---|---|---|---|---|
| First member | FRP1 | FRP2 | FRP3 | FRP1 | cedar |
| Second member | FRP1 | FRP2 | FRP3 | cedar | cedar |
| Volume fraction of voids in FRP (%) | 80 | 65 | 0 | 80 | — |

TABLE 1-continued

|  | Example 1 | Example 2 | Example 3 | Example 4 | Comparative example 1 |
|---|---|---|---|---|---|
| Partial compression modulus in direction where pressing force occurs in FRP (MPa) | 1,000 | 2,200 | 4,100 | 1,000 | — |
| Difference in size between first and second joint parts (mm) | 0.15 | 0.20 | 0.10 | 0.15 | 0.15 |
| Average thickness per layer in FRP (μm) | 2,730 | 1,560 | 550 | 2,730 | — |
| Average fiber length of reinforcing fibers (mm) | 6 | 6 | 6 | 6 | — |
| Area proportion of portion where pressing force occurs to maintain contact (%) | 100 | 100 | 100 | 100 | 100 |
| Recessed shape | groove | groove | groove | groove | groove |
| Vertical pull-out strength (MPa) | 0.18 | 0.34 | 0.33 | 0.17 | 0.16 |

EXPLANATION OF NUMERALS

11 first member
111 first joint part
21 second member
211 second joint part
12 first member
121 first joint part
22 second member
222 second joint part
131 first joint part
1311, 1312, 1313 surfaces forming recessed portion for groove
231 second joint part
2311, 2312, 2313 surfaces forming projected portion corresponding to recessed portion for groove
141 first joint part
1411, 1412, 1413, 1414, 1415 surfaces forming recessed portion for hole
241 second joint part
2411, 2412, 2413, 2414, 2415 surfaces forming projected portion corresponding to recessed portion for hole
251 second joint part corresponding to groove
252 second joint part corresponding to hole
61 jig for vertical pull-out test
62 cushioning plate for vertical pull-out test
71 test piece for partial compression test
72 cushioning plate for partial compression test
81 member shaped for half-lap joint

The invention claimed is:

1. A joint structure comprising:
a first joint part formed in a first member and a second joint part formed in a second member that are fitted and fixed together wherein at least either of the first member and the second member is made of a fiber reinforced plastic material that contains reinforcing fibers with an average fiber length of 1 mm or more;
wherein the first joint part has a recessed shape in at least one cross-section of the joint structure while the second joint part has a shape that fits into the recessed shape of the first joint part in that cross-section; and
wherein a pressing force exists between the first joint part and the second joint part so that the first member and the second member are fitted and fixed together.

2. The joint structure as set forth in claim 1, wherein the pressing force arises from a difference in size between the first joint part and the second joint part so that the first member and the second member are fitted and fixed together by the pressing force.

3. The joint structure as set forth in claim 1, wherein the member that is made of a fiber reinforced plastic material has a partial compression modulus of 1 MPa or more and 80 GPa or less in the direction where the pressing force occurs.

4. The joint structure as set forth in claim 1, wherein the member that is made of a fiber reinforced plastic material has a layered structure.

5. The joint structure as set forth in claim 4, wherein the layered structure has an average thickness per layer of 200 μm or more.

6. The joint structure as set forth in claim 1, wherein the reinforcing fibers present in the member that is made of a fiber reinforced plastic material has an average fiber length of 300 mm or less.

7. The joint structure as set forth in claim 1, wherein the reinforcing fibers present in the member that is made of a fiber reinforced plastic material are dispersed in a web-like manner so that reinforcing fibers are adhered together with resin at at least part of their intersections.

8. The joint structure as set forth in claim 7, wherein the fiber reinforced plastic material contains voids in an amount in the range of 20 vol % or more and 95 vol % or less.

9. The joint structure as set forth in claim 1, wherein in the portion where the first joint part and the second joint part face each other, the area proportion of the portion where contact is maintained by a pressing force accounts for 30% or more.

10. The joint structure as set forth in claim 1, wherein the vertical pull-out strength is 0.05 MPa or more.

11. The joint structure as set forth in claim 1, wherein the recessed portion is either a groove or a hole.

12. The joint structure as set forth in claim 11, wherein the recessed portion is a combination of a groove and a hole overlapping each other.

13. The joint structure as set forth in claim 1, wherein both the first member and the second member are made of fiber reinforced plastic material.

14. A joined assembly at least partly comprising the joint structure as set forth in claim 1.

15. A set of members comprising the first member and the second member and designed to form the joint structure as set forth in claim 1.

16. A joint structure comprising:
a first joint part formed in a first member and a second joint part formed in a second member that are fitted and fixed together wherein at least either of the first member and the second member is made of an elastic fiber reinforced plastic (FRP) member that contains reinforcing fibers with an average fiber length of 1 mm or more;

wherein the reinforcing fibers are dispersed in a web-like
manner so that reinforcing fibers are adhered together
with resin at at least part of their intersections, and that
contains voids in an amount in the range of 20 vol %
or more and 95 vol % or less;
wherein the first joint part has a recessed shape in at least
one cross-section of the joint structure while the second
joint part has a shape that fits into the recessed shape of
the first joint part in that cross-section; and
wherein a pressing force exists between the first joint part
and the second joint part so that the first member and
the second member are fitted and fixed together.

<div align="center">* * * * *</div>